(Model.)
N. B. HICKS.
FRUIT PITTER.
No. 281,507. Patented July 17, 1883.
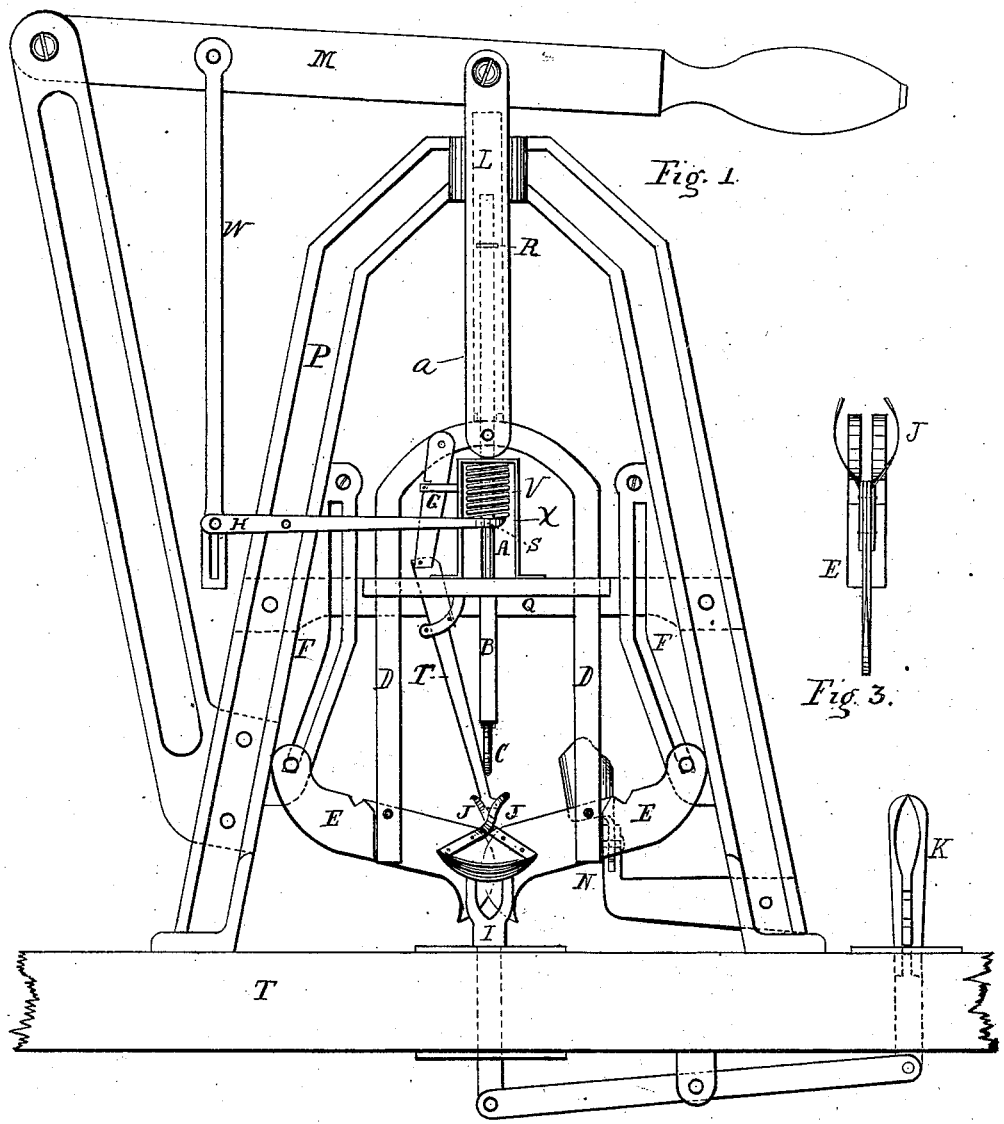
Attest:
F. L. Middleton
Walter Donaldson
Inventor:
Napoleon B. Hicks.
by Ellis Spear
Atty.

(Model.)
N. B. HICKS.
FRUIT PITTER.
No. 281,507. 3 Sheets—Sheet 2.
Patented July 17, 1883.
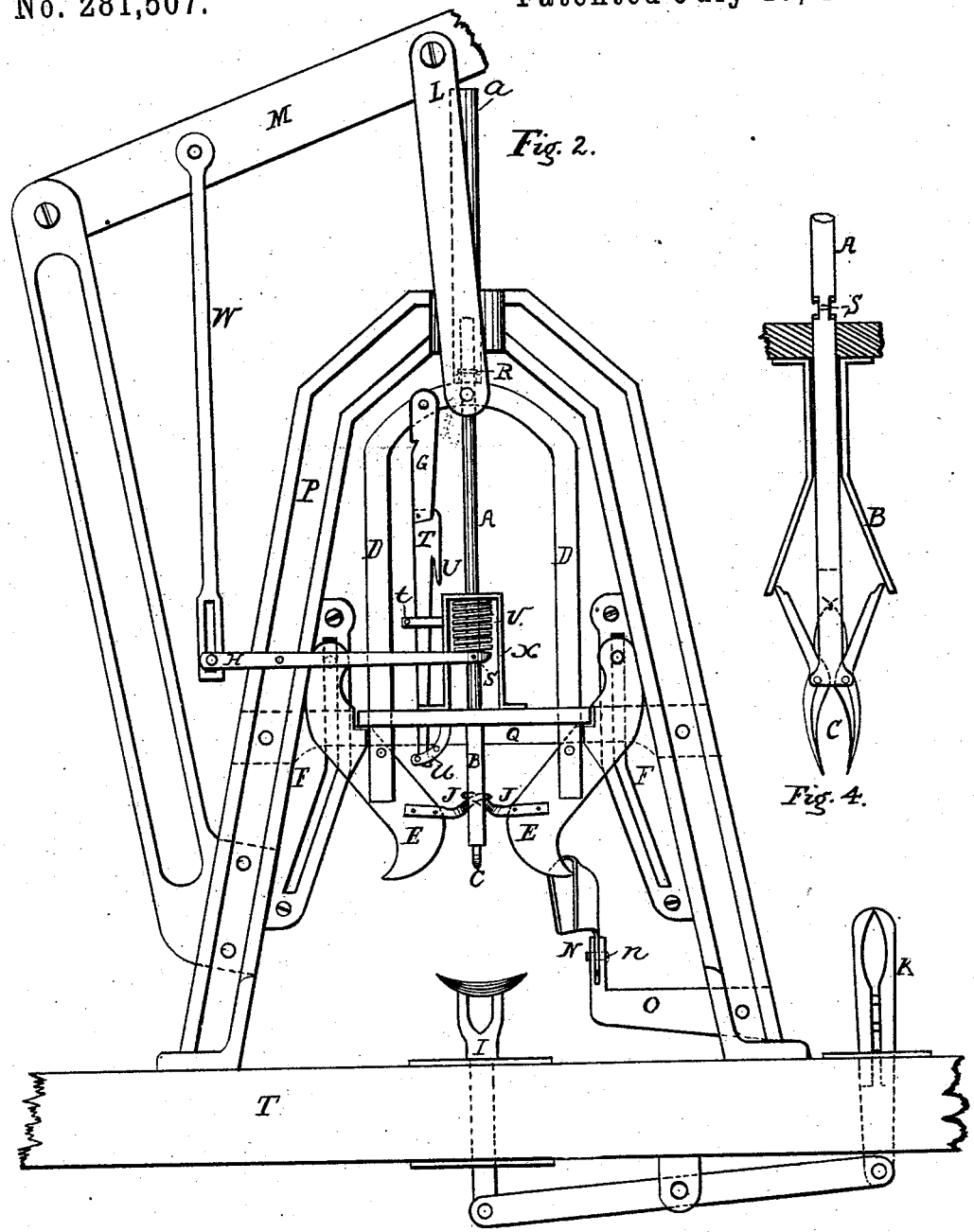
Attest:
J. L. Middleton
Walter Matson
Inventor:
Napoleon B. Hicks,
by Ellis Spear
Atty.

(Model.)
N. B. HICKS.
FRUIT PITTER.
No. 281,507.
3 Sheets—Sheet 3.
Patented July 17, 1883.
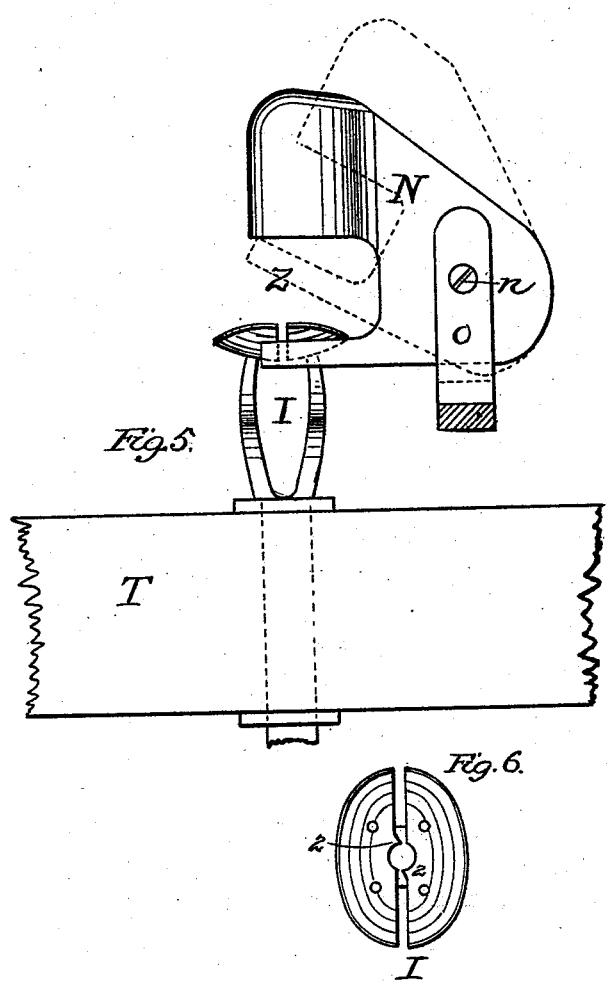
Attest,
F. L. Middleton
Inventor
Napoleon B. Hicks
by Ellis Spear
Atty.

UNITED STATES PATENT OFFICE.

NAPOLEON B. HICKS, OF SAN BERNARDINO, CALIFORNIA.

FRUIT-PITTER.

SPECIFICATION forming part of Letters Patent No. 281,507, dated July 17, 1883.

Application filed August 30, 1882. (Model.)

*To all whom it may concern:*

Be it known that I, NAPOLEON B. HICKS, of San Bernardino, in the county of San Bernardino and State of California, have invented certain new and useful Improvements pertaining to Clingstone-Fruit Pitters, of which the following is a specification, reference being had to the the accompanying drawings.

The invention consists in the improved construction and arrangement of the parts constituting the machine, and these I have hereinafter fully described and specifically claimed.

Figure 1 is the machine with the cutters down after having passed through the fruit. Fig. 2 represents the machine with the cutters up, ready to receive the fruit. Fig. 3 is an enlarged end view of the cutters, showing the cutting-edge that parts or splits the fruit, and the small cutters that cut around the sides of the pit. Fig. 4 is an enlarged side view of the adjustable fork that holds the pit in place while being cut, and also acts as a guide to the small cutters that cut around the pit. Fig. 5 shows a side elevation of the pit-guide. Fig. 6 shows the cup in place, with its slot.

In the drawings, P represents the frame of the machine, to which are attached the slotted guides F F and the cross-piece Q. Through this cross-piece, which acts as a guide therefor, passes the cross-head D D, the upper part of which is made fast to a hollow rod, a, which passes up through the main frame and acts as a guide to the cross-head.

In the lower ends of the cross-head are fastened by pivots the cutters E E, the rear ends of which work in the slotted guides F F. The cutters E E are knives which serve to part the fruit. At one of their extremities they are forked, and straddle the slotted guides playing over them, as shown in the figures. To these knives, in the proper position, are attached other small cutters, J J, which are bent to accommodate themselves to the size and shape of the pit, and serve to cut the fruit from the sides of the pit. They are made with spring enough to conform to any irregularities in the shape of the pit, and are guided to the bulge of the pit by the prongs of the fork C.

I is a movable standard for holding the fruit while being pitted. It is provided with a cup or receiver on top to accommodate the form of the fruit. This receiver has a slot through it lengthwise in the direction of the cutters E E to receive the points of the said cutters which part the fruit. This standard can be gaged in height to suit large or small fruit by the action of the lever K.

C represents an adjustable fork for holding the fruit in position while in process of cutting. It is connected to the rod A, which moves freely inside of the hollow rod at the top of cross-head. This fork also guides the motion of the small cutters J J around the bulge of the pit. The rod A passes through the cross-bar Q, and through a yoke, x, fixed to the upper surface of said cross-bar. The rod is cut away on opposite sides, as shown at S, Fig. 4, to receive the prongs of a lever, H, which prevents the fork from turning. Bearing on the forked end of this lever, and upon the cross-piece of the yoke x, is a spring, v, which tends to throw the fork downward. At an instant, as hereinafter explained, the spring is compressed and the fork raised by means of the lever H. This lever is connected to the lever M by means of a pitman, W, connected to the short arm of lever H by a pin in end of said short arm, which works in a slot near the end of pitman W. This slot is long enough to permit the spring to act on the rod A freely until the pitman W has descended to bring the upper end of the slot down to the pin on lever H, which depresses the short end of the lever and raises the fork.

G and T show an arm, whose office is to throw out the pit after the fruit has been separated from it. Said pit will then be guided by the guide N, placed in a proper position to direct it, through a hole in the table T, into a receptacle separate from the fruit. The upper part of arm marked G is pivoted on cross-head D, and the lower part, T, is pivoted to G. Both pass through a slotted guide, t, on yoke x, and the lower through a guide or arc, u, on cross-piece Q. A slotted part, U, passes over a pin in arc u, which, when the lever M is down, as in Fig. 1, turns quickly aside the arm T, thus ejecting the pit.

The guard N is shown in front elevation in Figs. 1 and 2, and in side elevation (enlarged) in Fig. 5. It is a curved guard of sheet metal, with its hollow face toward the cup, and approximately in line therewith. It is provided with a pin, n, by which it is pivoted on standard o, which has a projection, p, extending underneath the guard, as shown in Fig. 5.

One of the cutters E, in its motion up and down, gives corresponding motion to the guard, so that the guard is in place, as shown in full lines, when the fruit is under the action of the cutters and ejector, and is raised, as shown in dotted lines in same figure, when the cutter is raised. When the pit is thrown out, it strikes against the guard, and is deflected always in the same direction, while the fruit is dropped separately into a suitable dish. The cup is shown in plan in Fig. 6, which shows also the slot across its center. This cup has points 2 2, which guide the cutters E E and cause them to pass each other like shears. It will be observed that the construction of the cutters and guiding-slots gives a downward, horizontal, and circular motion to the cutting ends, whereby they are made to pass around the pit and cut the fruit cleanly therefrom. Movement is given to the cross-heads by the pitmen L, which are connected to the lever M.

To operate the machine it is started with the knives up, as in Fig. 2. A peach or other fruit is placed on the cup of the standard I, with the stem end up. The prongs of the adjustable fork are then standing open to their widest extent, being held farther up by the pin R through the rod A, which catches on a shoulder in the bottom of the upright hollow rod as this rod rises. The shanks of the fork are thereby compressed against the guides B, (shown in Fig. 4,) causing the points of the fork to remain open to their widest extent. By a downward motion given to the lever M the cross-head is driven down, carrying with it the cutters E E, and the adjustable fork, being released by the descent of the hollow rod, is driven down by the spring V. The fork, on arriving at the fruit, penetrates it, a prong of the fork entering on each side of the pit, thus firmly holding it in position while the points of the cutters E are splitting the fruit, and the small cutters J J are cutting around the sides of the pit, they being guided to the bulge of the pit by the prongs of the fork. When the cutters E E have passed below the center of the pit, the pitman W, descending farther, causes the end of slot in pitman W to strike the lever H, which is connected with the shaft A by slots in the shaft, as hereinbefore explained, to raise the fork C from off the pit, leaving the pit free to be acted upon by the arm T, which is operated by the slot u in the arm catching on the pin in the arc fastened on the lower side of cross-piece Q, thereby throwing the pit to one side, where it is guided by the guard N through the table into its proper receiver, while the fruit falls on each side of the standard I into its proper receptacle. An upward movement given to the lever M brings the machine back to its original position, ready to receive more fruit. When the lever M starts up, the pressure, being taken off the pitman W, allows the spring V to lower the fork C, so that the points are closed to allow the upward passage of the small cutters J J. Once they having passed above the fork, the pin R, catching on the shoulder in bottom of hollow rod, takes the fork up under the guides B, causing the points to extend their utmost, as at first starting.

I claim—

1. In a fruit-pitting machine, the combination, with the cutters E E, of a fruit-holder, guides F in the frame-work, and the lever M and connections for elevating and depressing said cutters, substantially as described.

2. The combination, in a fruit-pitter, of the fruit-holder, the pivoted cutters E E, and a lever and connections for elevating said cutters, with the auxiliary cutters J, attached to said cutters E, and adapted to operate in connection therewith, substantially as described.

3. In a fruit-pitter, the fruit-holder and the adjustable fork C, adapted to hold the pit in place, in combination with cutters E E and J J, said fork serving also as a guide for the side cutters, as set forth.

4. The combination of the fork C, rod A, pin R, and hollow rod a with the lever H, connecting-rod W, and lever M and spring V, and the described holder and cutters.

5. In a fruit-pitter, the combination, with the cutters and the fruit-holder, of a pit-ejector consisting of pivoted arms G T, connected to a vertically-moving frame, and operated by the lever M and its connections, the said arm T having the hook U engaging with the pin u, whereby the point of the ejector is deflected and turned inward to eject the pit, substantially as described.

6. The guard N, arranged in the described relation to the cutters, and in combination with the ejector, as set forth.

In testimony whereof I have signed my name to this specification in the presence of two subscribing witnesses.

NAPOLEON B. HICKS.

Witnesses:
I. A. BROWN,
W. J. CURTIS.